Feb. 14, 1928. 1,659,050
R. J. SASSEMAN
STORAGE BATTERY CHARGING APPARATUS
Filed Jan. 30, 1925 2 Sheets-Sheet 1
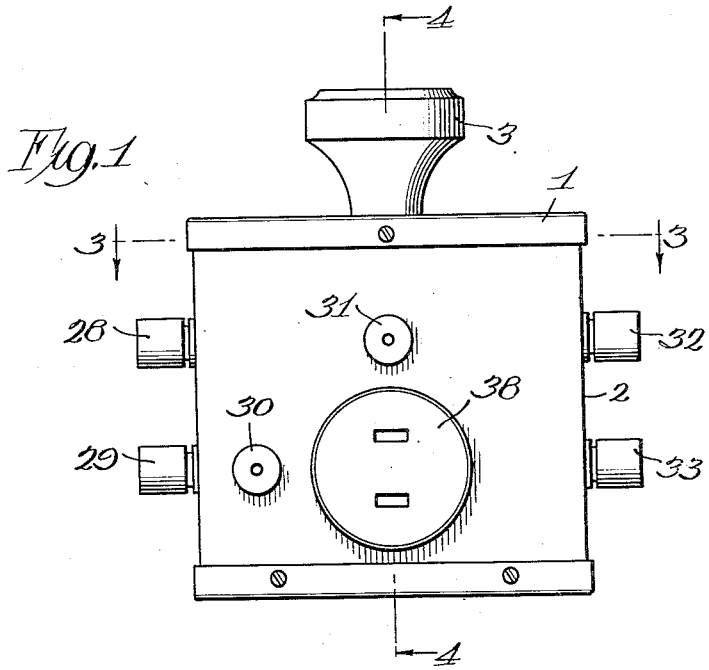
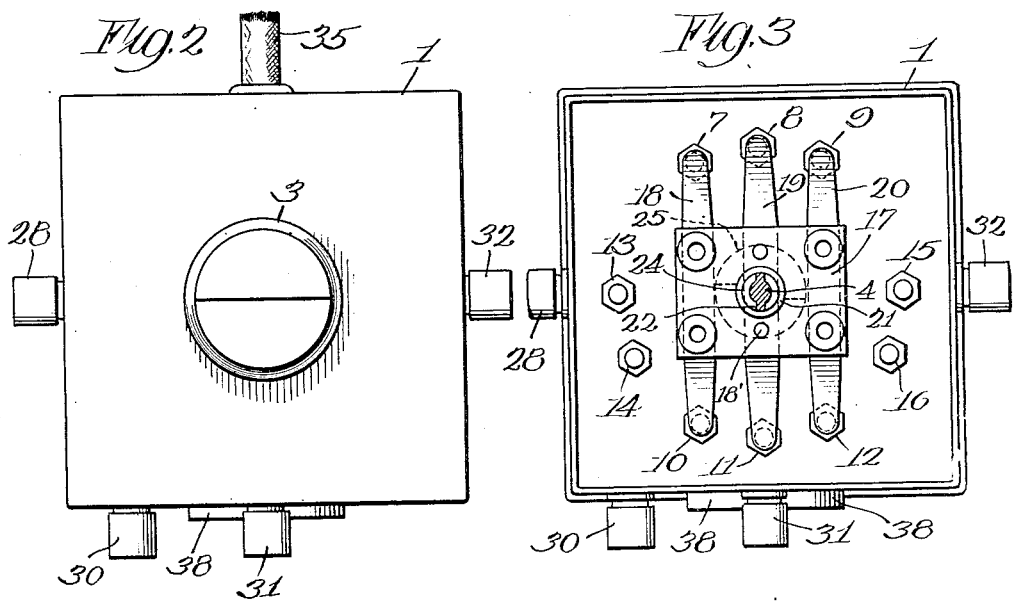
Inventor:
Robert J. Sasseman
By Arthur F. Durand
Atty.

Feb. 14, 1928.
R. J. SASSEMAN
STORAGE BATTERY CHARGING APPARATUS
Filed Jan. 30, 1925
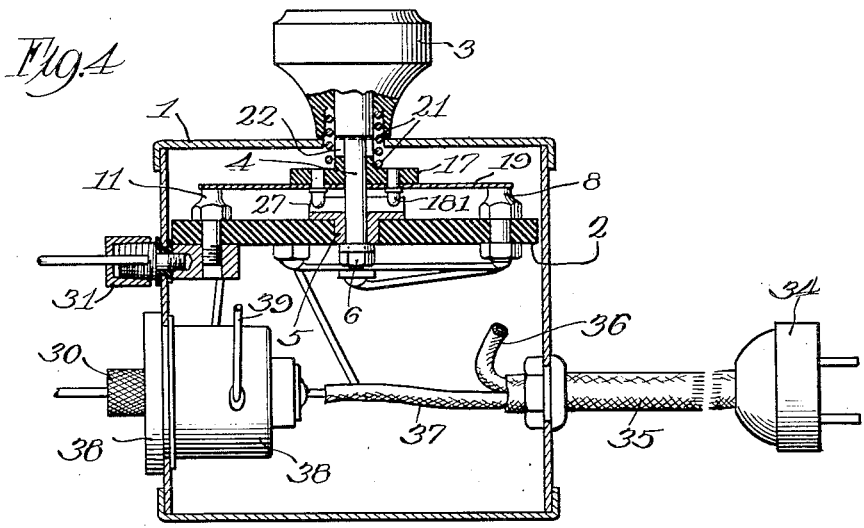
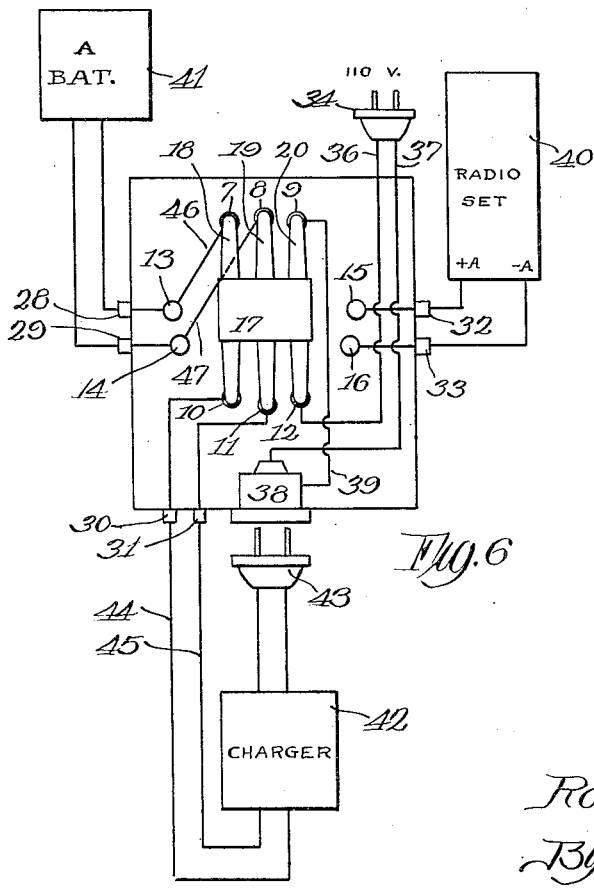
Inventor:
Robert J. Sasseman
By Arthur F. Durand
Atty.

Patented Feb. 14, 1928.

1,659,050

UNITED STATES PATENT OFFICE.

ROBERT J. SASSEMAN, OF CHICAGO, ILLINOIS.

STORAGE-BATTERY-CHARGING APPARATUS.

Application filed January 30, 1925. Serial No. 5,682.

This invention relates to devices for use in charging the storage batteries of radio receiving apparatus, or for similar purposes.

Generally stated, the object of the invention is the provision of a novel and improved switching device and circuit arrangement whereby the source of charging current can be turned on or cut off, and various connections opened and closed, for the purpose of starting and stopping the charging operation by means of a single switch handle or manually operated element, thus avoiding the inconvenience of making certain connections and disconnections heretofore necessary with the ordinary charging arrangements.

It is also an object to provide certain details and features of construction and combinations tending to increase the general efficiency and the desirability of a storage-battery charging switch mechanism of this particular character.

To the foregoing and other useful ends, the invention consists in the matters hereinafter set forth and claimed, and shown in the accompanying drawings, of which,—

Fig. 1 is a side elevation of a storage-battery charging switch mechanism embodying the principles of the invention.

Fig. 2 is a top view of said switch mechanism.

Fig. 3 is a horizontal section on line 3—3 in Fig. 1.

Fig. 4 is a vertical section on line 4—4 in Fig. 1.

Fig. 5 is a detail view of some of the parts of the switch mechanism.

Fig. 6 is a diagram of the circuits involved in the use of the invention in connection with an ordinary radio receiving set.

As thus illustrated, the invention, so far as the switch mechanism itself is concerned, comprises a box 1 containing a bracket shelf 2 of ordinary insulation of any suitable character. A handle or manually operated member 3 is disposed on top of the box, and is provided with a stem 4 that passes downwardly and into a bearing 5 on said bracket shelf, such member having nuts 6 to prevent upward displacement thereof. Upon the shelf 2 are the contacts 7, 8, 9 and 10, 11, 12 and 13, 14 and 15, 16, of any suitable character. The insulation 17 is connected with the stem 4, and is provided with the parallel contact strips 18, 19, 20, as shown, whereby these contact strips are in position to rotate in a plane above the said stationary contacts on the shelf. A spring 21 is applied to the rotary knob 3, as shown in Fig. 4 of the drawings, and arranged to rest on the member 17, thereby to permit the member 17 to move up and down in the operation of the switch mechanism. For this purpose, the stem 4 has a key 22 that engages the notch 23 in the hub 24 of the member 17, and the latter has rounded projections 181 on the under side thereof disposed diametrically opposite each other. The bearing 5 has its upper portion 25 provided with ratchet-like notches 26, arranged diametrically opposite, so that these rounded portions 18 can move out of these notches and raise the member 17 when the knob or handle 3 is turned to the right, or in a clockwise direction, but not when it is attempted to turn the handle to the left or in the opposite direction. Therefore, when the handle is rotated, the member 17 will be raised and will remain in this position until the strips 18, 19 and 20 are brought opposite, for example, the contacts 7, 8, 9 and 10, 11, 12, and then the portions 18 will drop into the notches 26 and allow the strips to make electrical contact with said stationary contacts on the shelf. A quarter rotation of the handle or knob 3, however, will then first cause the portions 18 to rise out of the notches 26, and travel around with the strips 18, 19 and 20 in raised position until these portions 18 then drop into the similar notches 27 of said bearing member 5 previously mentioned. In such position, the strips 19 and 20 will contact with the stationary contacts 13, 14 and 15, 16, on the shelf. Binding posts 28, 29 and 30, 31 and 32, 33, are provided on the sides of the box to facilitate the making of the electrical connections thereto. The plug 34 is adapted to be connected to any ordinary fixture for supplying current and is connected to the side of the box by an insulated cord 35 having the two conductors 36 and 37 thereof connected, respectively, to the contact 12 and the plug socket 38 mounted on the other side of the box, inside thereof. Inside of the box, contact 9 is connected by a conductor 39 with the other terminal of the plug socket 38, whereby the charging current will pass from the plug 34 into the box to the plug socket 38, and anything connected to the socket 38 will then receive current therefrom.

As shown in Fig. 6, the invention is employed in connection with radio receiving apparatus 40 of any suitable or desired character. For this purpose, the radio receiving set is connected to the two stationary contacts 15 and 16 in the manner shown. The storage battery 41 of the radio apparatus is in turn connected to the stationary contacts 13 and 14 previously mentioned. A charger 42, which may be of any suitable character, such as those employed for converting an alternating current into a direct current, or for otherwise changing the current to make it suitable for charging purposes, is provided with a plug 43 for insertion in the plug socket 38 previously mentioned. At the other side, the charger 42 is connected by conductors 44 and 45 to the contacts 10 and 11, respectively. Also, the contacts 13 and 14 are connected by conductors 46 and 47 with the contacts 7 and 8, respectively, the contacts 13 and 14 being connected to the terminals of the storage battery 41, as shown.

In such case, as illustrated in Fig. 6, no connections have to be broken, and the plug 43 does not have to be inserted and pulled out, inasmuch as rotation of the switch handle or knob 3 is all that is necessary to disconnect the battery 41 from the radio set and to connect it instead to the source of charging current. Then, when the battery is charged, it is only necessary to give the knob 53 another turn to bring the strips 19 and 20 into engagement with the contacts 13, 14 and 15, 16, so that the source of charging current is cut off and the battery 41 is instead connected to the radio set only. As shown in Fig. 6, and with the plug 43 inserted in the plug socket 38, the apparatus is in condition for the charging of the battery, the radio set 40 being cut off entirely. A quarter turn of the handle 3, however, will cut off the source of charging current, by disengaging the strip 20 from the contacts 9 and 12, and will connect the battery to the radio set, by connecting the contacts 13, 14 to the contacts 15, 16, through the strips 19, 20, in a manner that will be readily understood.

As stated, the binding posts on the outside of the box 1 can be used, in any suitable manner, to make the connections. After everything is connected in the manner shown, the switch will be operated to charge the battery without breaking any of the connections leading to the switch box, and without manipulation of any of the binding posts on the outside of the switch box, and without any manipulation of the plug 43, and the same is true when the battery is charged and it is desired to cut off the source of charging current. In other words, the switch box remains connected to the battery and to the radio set and to the charger, but by means of the mechanism within the box, the circuits can be opened and closed in a manner to disconnect the battery from the radio set and connect it instead to the source of charging current, and vice versa, by merely rotating the switch knob, the battery can be re-connected to the radio set and disconnected from the source of charging current, and, whether the battery is being charged or is in use, the plug 34 remains in the socket of the electric light fixture.

Thus it will be seen that the switch mechanism has two diametrically opposite translation circuit positions, and two diametrically opposite charging circuit positions. Of course, when the radio apparatus is in use, the charging circuit positions can be used as open circuit positions for the switch, the plug 34 having been detached from the source of current.

What I claim as my invention is:

1. In combination with a storage battery and an apparatus to be operated by current from said battery, a rotary manual switch mechanism having two diametrically opposite translation circuit positions and two diametrically opposite charging circuit positions, adapted to be connected to a source of charging current and provided with co-operating stationary and movable switch contacts, said switch adapted by motion of the movable contacts to either charging position to disconnect the battery from said apparatus and connect the battery instead to the source of charging current, and adapted by movement of the same contacts to either translation position to connect the battery to said apparatus and disconnect the source of charging current.

2. Apparatus as specified in claim 1, said switch mechanism comprising a box having said stationary and movable contacts therein and provided with a single rotary knob for operating the movable contacts to any one of said positions, rotatable in one direction only, together with means for forming circuit connections between the box and the battery, between the box and the said apparatus, and between the box and the source of current.

3. Apparatus as specified in claim 1, comprising a charger, said switch mechanism comprising a box having said stationary and movable contacts therein, and provided with a single rotary knob for operating all of the movable contacts, together with means for forming circuit connections between the box and the battery, between the box and the said apparatus, and between the box and the source of charging current, and including means for connecting the charger between the source of current and the battery.

4. A structure as specified in claim 1, said switch mechanism comprising a rotary handle for operating the movable switch contacts, and means for yieldingly holding said switch contacts in either one of said two positions thereof, said contacts comprising ten stationary contacts and three parallel strips forming six movable contacts, the three strips being arranged parallel side by side, the middle strip being included with the other two strips in the charging circuit in either charging position of the switch, and also in the translation circuit in either translation position of the switch, but each outside strip being excluded from the translation circuit in the position in which the other is included, whereby three stationary contacts may be connected by the three strips to three other stationary contacts for the charging of the battery, and whereby two stationary contacts may be connected by two of said strips to two other stationary contacts to connect the battery to said apparatus.

Specification signed this 23rd day of January, 1925.

ROBERT J. SASSEMAN.